United States Patent [19]

Leighty et al.

[11] 4,360,799
[45] Nov. 23, 1982

[54] HYBRID OPTICAL-DIGITAL PATTERN RECOGNITION APPARATUS AND METHOD

[76] Inventors: Robert D. Leighty, 604 Manor Dr., Vienna, Va. 22180; George E. Lukes, 304 Cloverway, Alexandria, Va. 22314

[21] Appl. No.: 152,441

[22] Filed: May 22, 1980

[51] Int. Cl.³ .............................................. G06K 9/20
[52] U.S. Cl. ......................... 340/146.3 P; 350/162 SF; 340/146.3 AQ
[58] Field of Search ................... 340/146.3 P, 146.3 Q, 340/146.3 E, 146.3 F, 146.3 G, 146.3 AQ; 356/71; 364/515; 350/162 SF, 3.81, 3.82, 3.68, 3.6

[56] References Cited

U.S. PATENT DOCUMENTS

| 3,074,634 | 1/1963 | Gamo | 340/146.3 F |
|---|---|---|---|
| 3,274,380 | 9/1966 | Moskowitz | 340/146.3 G |
| 3,274,549 | 9/1966 | Moskowitz | 340/146.3 G |
| 3,519,992 | 7/1970 | Rau | 340/146.3 P |
| 3,689,772 | 9/1972 | George et al. | 340/146.3 P |
| 3,748,644 | 7/1973 | Tisdale | 340/146.3 Q |
| 3,771,124 | 11/1973 | McMahon | 340/146.3 E |
| 3,823,261 | 7/1974 | Bolsey | 340/146.3 Q |
| 3,944,978 | 3/1976 | Jensen et al. | 340/146.3 P |
| 3,947,833 | 3/1976 | Eckstein, Jr. | 340/146.3 Q |
| 3,984,671 | 10/1976 | Fletcher et al. | 340/146.3 P |
| 4,135,147 | 1/1979 | Riganati et al. | 340/146.3 E |
| 4,151,512 | 4/1979 | Riganati et al. | 340/146.3 E |
| 4,213,036 | 7/1980 | Kopp et al. | 340/146.3 P |
| 4,225,850 | 9/1980 | Chang et al. | 340/146.3 E |

OTHER PUBLICATIONS

McMahon et al., "A Hybrid Optical Comp. Processing Technique for Fingerprint ID.", *IEEE Trans. on Computers,* vol. C-24, No. 4, Apr., 1975, pp. 358-369.

*Primary Examiner*—Leo H. Boudreau
*Attorney, Agent, or Firm*—Darrell E. Hollis

[57] ABSTRACT

An improved apparatus and method of pattern recognition and of providing pattern recognition data, which possesses the advantages of optical power spectral analysis and digital image processing. An optical read-only memory means such as a photographic transparency is sampled at a plurality of sampling locations with a beam of coherent light. After passage through the transparency, the beam is directed either to a first channel including a transform lens and a wedge-ring detector or to a second channel including an imaging lens and a photodetector array. The improved pattern recognition data is the spatial frequency data provided by the wedge-ring detector and the spatial intensity data provided by the array detector. Hierarchal pattern recognition decisions are made using the two types of data during processing operations to provide improved pattern recognition results.

9 Claims, 9 Drawing Figures

FIG.8

| DATA | ANALYSIS MODE | | | |
|---|---|---|---|---|
| | 1 | 2 | 3 | 4 |
| WEDGE | X | X | X | X |
| RING | | X | | X |
| IMAGE | | | X | X |

FIG.9

| MODE 1 | ROAD | NON-ROAD | CLASSIFIER RESULTS |
|---|---|---|---|
| ROAD | 51 | 49 | 100 |
| NON-ROAD | 13 | 512 | 525 |
| TRUTH | 64 | 561 | 625 |
| MODE 2 | ROAD | NON-ROAD | CLASSIFIER RESULTS |
| ROAD | 52 | 34 | 86 |
| NON-ROAD | 12 | 527 | 539 |
| TRUTH | 64 | 561 | 625 |
| MODE 3 | ROAD | NON-ROAD | CLASSIFIER RESULTS |
| ROAD | 42 | 17 | 59 |
| NON-ROAD | 17 | 549 | 566 |
| TRUTH | 59 | 566 | 625 |
| MODE 4 | ROAD | NON-ROAD | CLASSIFIER RESULTS |
| ROAD | 41 | 13 | 54 |
| NON-ROAD | 18 | 553 | 571 |
| TRUTH | 59 | 566 | 625 |

HYBRID OPTICAL-DIGITAL PATTERN RECOGNITION APPARATUS AND METHOD

FIELD OF THE INVENTION

The present invention is directed to an improved pattern recognition apparatus and method, and to an apparatus for providing improved pattern recognition data.

BACKGROUND OF THE INVENTION

The pattern recognition technique of optical power spectral analysis (OPS) is well-known. In accordance with this technique, a lens is utilized to take the Fourier transform of samples of a pattern, and the resulting Fraunhoffer diffraction patterns are characterized, such as by the use of a wedge-ring detector and digital analysis to classify the pattern. While OPS has demonstrated significant advantages for rapidly classifying simple patterns, it has been found that as the pattern sets become larger and more complicated, the required software inevitably becomes more complex, the equipment requirements more demanding, and the processing time increases. Further, potential ambiguity of the data due to the loss of phase information places an upper limit on the information content, thus limiting the complexity of the patterns which can be classified by this technique.

The recognition technique of digital image processing is also well-known in the art. In accordance with this technique, an image which is sampled in the space domain is digitized and is loaded into a computer and processed in accordnce with known pattern recognition algorithms which can involve electronically taking the Fourier transform function. While digital image processing techniques are capable of high sample resolution and have the advantage of being able to recognize complex patterns of high space-bandwidth product, due to the great amount of information which must be processed, such techniques are undesirably slow. For example, in classifying the high space-bandwidth product patterns present in aerial photographic transparencies, wherein a frame may typically include 625 sampling locations, each of which may be resolved into 1024 sub-areas for digital processing, it has been found that even the fastest digital computers may not meet acceptable time constraints.

BRIEF SUMMARY OF THE INVENTION

The present invention provides a hybrid optical/digital system in which the best qualities of both OPS and digital image processing techniques are utilized. Thus, in the apparatus of the invention, optical power spectral analysis is used to accomplish rapid, preliminary classification patterns of potential interest, while space domain classification is initiated only when patterns of interest are identified by the results of the OPS analysis.

In a preferred embodiment of the invention, an optical memory, such as a photographic transparency which stores an image function having patterns to be classified, is irradiated with a beam of coherent light. After the beam passes through the transparency, a chopper mirror is operated to direct the beam either to a transform lens and wedge-ring detector for OPS sampling, or to a photodetector matrix array for space domain sampling.

The sampling system is computer-controlled and may be arranged either for providing frequency and space samples of each image location which are subsequently processed in a manner such that spatial information is used only after frequency information has indicated an area of interest, or for providing frequency samples of each location, and space samples for given locations only when frequency samples indicate that information of interest is present at these locations.

Thus, in accordance with the hybrid configuration of the invention, the special advantages of both the optical power spectrum and digital image processing modes are obtained. Patterns are initially classified with the speed provided by the optical power spectrum system, and can be ultimately classified with the precision and high degree of sampling resolution provided by the digital image processing system.

While not so limited, the invention finds particular use for recognizing patterns from aerial transparencies which depict an area of terrain. Many pattern features which are of interest in such transparencies, for example the presence of roads, are simple enough so that the initial first order approximation provided by the OPS system is of value in providing a preliminary classification, while the higher resolution data which is provided by the spatial sampling is utilized when the OPS indicates that a feature of interest may be present.

It is therefore an object of the present invention to provide an improved pattern recognition apparatus and method.

It is a further object of the invention to provide an apparatus for providing improved pattern recognition data.

It is a further object of the invention to provide an apparatus and method of pattern recognition which is capable of classifying high space-bandwidth product patterns with speed and accuracy.

It is still a further object of the invention to provide an improved method and apparatus for classifying patterns in aerial photographic transparencies.

BRIEF DESCRIPTION OF THE DRAWINGS

The invention will be better understood by referring to the accompanying drawings in which:

FIG. 8 shows a matrix which depicts possible selections of analysis modes.

FIG. 9 shows a number of confusion matrices which present the classification results for the respective analysis modes of FIG. 8.

DETAILED DESCRIPTION OF EMBODIMENTS

Figure 1:
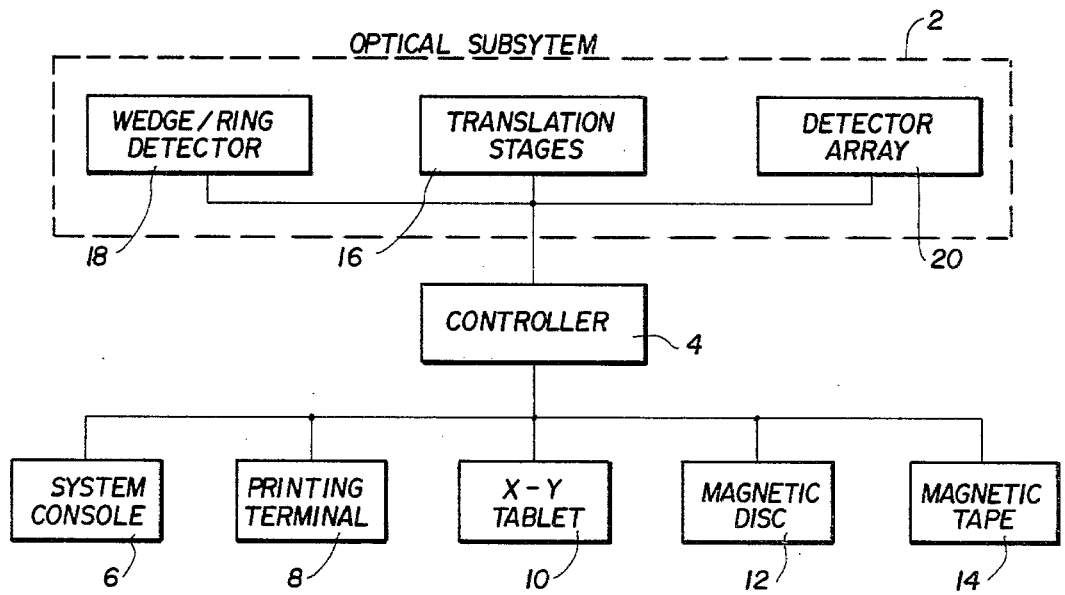
FIG. 1 is a block diagram of an apparatus in accordance with the present invention.

FIG. 1 is a block diagram of an overall apparatus in accordance with the present invention. Referring to the Figure, it will be seen that the apparatus is comprised of controller 4, optical sub-system 2, and a plurality of input-output peripheral devices denoted by reference numerals 6, 8, 10, 12 and 14, which are connected to the controller. The optical sub-system 2 includes translation stages 16, which are comprised of a pair of stepping motors for moving a transparency to be analyzed in x and y coordinate directions to a plurality of sampling positions, wedge-ring detector 18 for providing spatial frequency input data, and image array detector 20 for providing space or image domain data.

In the operation of the apparatus, controller 4, which for example may be a mini-computer, controls the movement of the translation stages, the sampling of the transparency by the respective frequency domain and image domain detectors, and the routing of the detected signals to the output devices. In the illustrative embodiment, the output storage devices provided are magnetic tape 14, and magnetic disk 12, although it is to be understood that any conventional storage means may be utilized. Additionally, a printing terminal 8, a system console 6 containing general controls, and a digital data tablet which is used to enter x-y coordinates from aerial photographs to identify ground control points and other data are provided.

Figure 2:
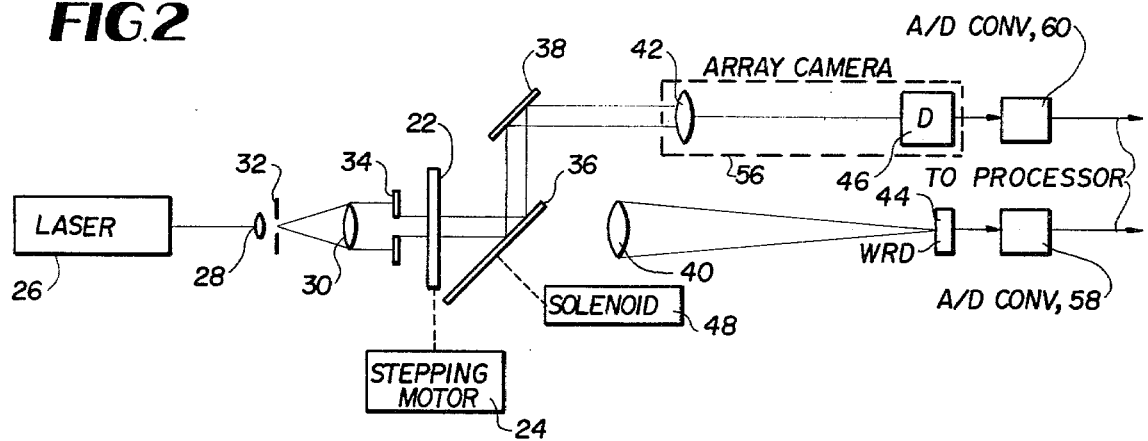
FIG. 2 is an exemplary embodiment of an optical system in accordance with the invention which is used in the apparatus of FIG. 1, and which provides both frequency domain and space domain sampling.

A more detailed diagram of the optical sub-system 2 is shown in FIG. 2. Thus, photographic transparency 22 or other optical read-only memory means having a stored image function including patterns to be classified is provided, and is mounted in a conventional manner for movement to a plurality of sampling positions by stepping motors 24. A coherent light beam of appropriate size for sampling the transparency is provided by laser 26, collimating optics comprised of lenses 28 and 30 having spatial filtering aperture 32 therebetween, and sampling aperture 34. On the other side of the transparency, a plurality of optical elements including butterfly chopper mirror 36, transform lens 40, wedge-ring detector 44, beam deflecting mirror 38, imaging lens 42, and image array detector 46, are provided.

In the operation of the apparatus, the position of the butterfly chopper mirror or other chopping means which may be provided is selectively controlled to direct the sampling beam passing through transparency 22 either straight ahead to Fourier transform-taking lens 40 and wedge-ring detector 44, or to beam-deflecting mirror 38, imaging lens 42, and image detector array 46. As known to those skilled in the art, transform lens 40 focuses the Fraunhoffer diffraction pattern of the image, which contains the spatial frequency information corresponding thereto, on wedge-ring detector 44, while imaging lens 42 focuses an image of the sampled information upon image array detector 46. The position of the chopper means is controlled by signals inputted from the controller to mirror-controlling solenoid 48.

Figure 3:
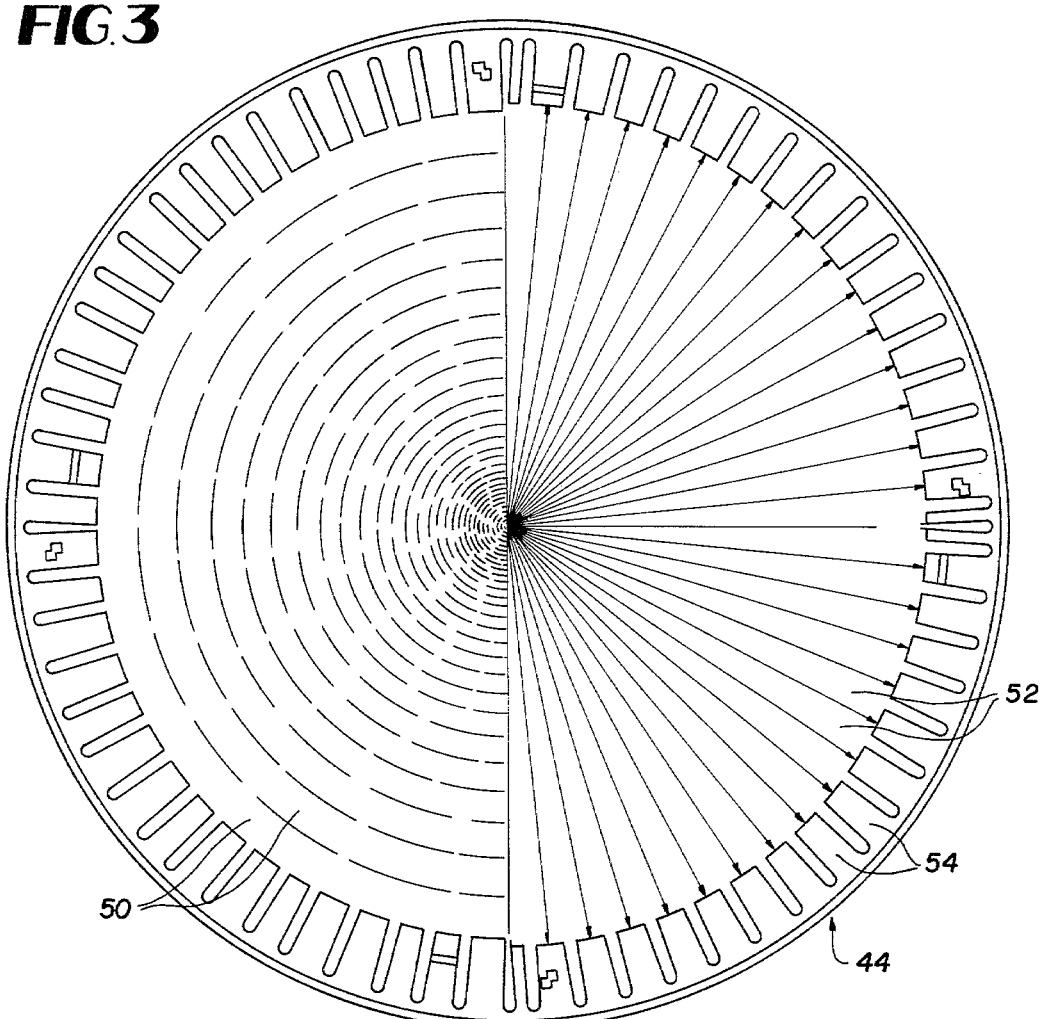
FIG. 3 is a schematic representation of the wedge-ring detector shown in FIG. 2.

A detailed schematic representation of the wedge-ring detector 44 is depicted in FIG. 3. The detector is seen to be circular in shape and has one-half divided into a plurality of semi-annular rings 50 and the other half divided into a plurality of wedges 52. Each of the rings and wedges is made of photo-detecting material, and each element adds up or integrates the total amount of light falling on that element. Conducting contacts 54, which are connected to the respective ring and wedge elements, are disposed around the periphery of the detector.

Since the Fraunhoffer diffraction pattern possesses circular symmetry, the rings and wedges sample the diffracted energy in polar coordinate form. That is, the rings sample the distance of the diffraction pattern portions from the axis, while the wedges sample the direction at which portions of the pattern are disposed. A suitable wedge-ring detector, having 32 rings and 32 wedges, is disclosed in U.S. Pat. No. 3,689,772, and is manufactured by Recognition Systems, Inc. of Van Nuys, Calif.

Image array detector 46 is an array which is comprised of a matrix of photodiode detectors, and may for instance be a 32 by 32 element device such as the Reticon model RA32X32A. Actually, imaging lens 42 and array detector 46 may comprise a unitary structure, such as array camera 56, which is denoted by reference numeral 56 in FIG. 2.

The controller 4, may be arranged by way of a stored program so that for each sampling location which transparency 22 is moved to, one frequency domain sample and one image domain sample is taken. That is, for each sampling location, solenoid 48 is activated so as to move butterfly chopper mirror 36 out of the way of the sampling beam, and then in the way of the sampling beam to deflect it upwardly in the Figure to mirror 38. The signals from the wedge-ring detector and the image array detector for each sampling location, after being suitably amplified are fed to respective analog to digital converting means 58 and 60, which convert the analog electrical cell outputs to digital signals. Controller 4 is arranged to then route these signals to storage means such as the magnetic tape 14 which is depicted in FIG. 1.

Thus, if the 64 element wedge-ring detector described above and the 1024 element image array detector discussed, are utilized, 64 digital numbers representative of spatial frequency domain information and 1024 digital numbers representative of image domain intensity information will be stored on magnetic tape. As an illustration, a transparency typically may be sampled at 625 sampling locations on a square 25 by 25 grid, and in such a case, the above-mentioned digital numbers will be stored on the magnetic tape for each such location to characterize the information in the transparency.

Figure 4:
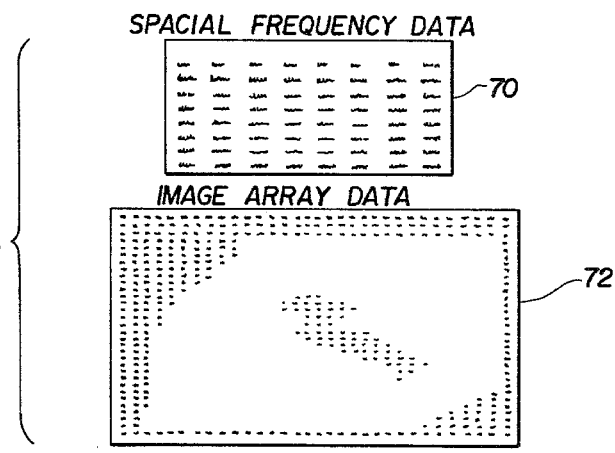
FIG. 4 is a representation of illustrative wedge-ring and image array data for one sampling location which is sampled by the optical system of FIG. 2.

The improved pattern recognition data provided by the apparatus of the invention for one sampling location is illustratively represented in FIG. 4. That Figure is comprised of two tables of numbers, the top table 70 containing 64 numbers indicative of the spatial frequency data which is recorded on the magnetic tape for each sampling location, and the bottom table 72 comprised of the 1024 numbers of image array intensity data which is recorded on the tape for each sample.

The programming of controller 4 to accomplish the above-described data-recording operations is routine, and within the skill of one in the art. The controller, for example, may be a Hewlett-Packard HP2112 mini-computer running under the RTE IV operating system.

In order to recognize patterns from the improved pattern recognition data, the data stored on the magnetic tape is processed in a computer which is programmed to make hierarchal pattern recognition decisions. The advantage of the invention is in providing both the spatial frequency and image domain information for processing, so that preliminary classification decisions may be made on the basis of the frequency data while image domain data is only processed when the frequency data indicates samples of interest. For example, if a transparency frame contains 625 sampling locations, and the spatial frequency data indicates that 500 of the sampling locations are not of interest, then the image domain information will be processed only for the remaining 125 sampling locations, thus saving the substantial processing time that would have been involved in processing the other 500 sampling locations, each having 1024 numbers to be processed.

If desired, the controller 4 may be programmed so as to control chopper mirror 36 to provide only frequency domain samples, each of which would be processed to determine if the sample was of interest. If it was, than before moving on to the next sample, the chopper mirror would be deflected so as to also provide image domain information for that sample, but if the sample were not of interest, the mirror would not be deflected, and no image domain information would be generated. Thus, in this case, even more processing time is saved than in the previously described embodiment.

Figure 5:
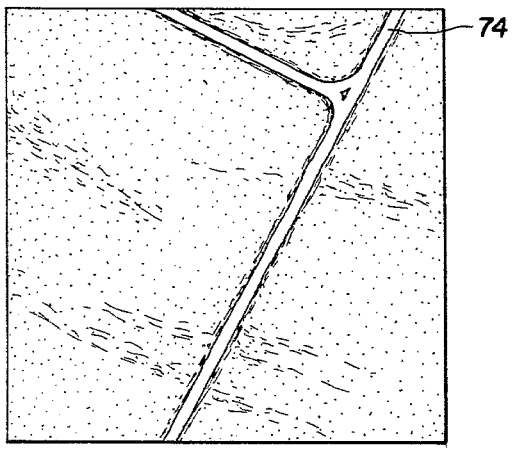
FIG. 5 is a drawing of a portion of an exemplary aerial transparency including a portion of road, but not showing the gray scale of the photograph.

FIGS. 5 to 9 are useful in illustrating the improved pattern classification scheme of the invention. FIG. 5 is a representation of a small portion of an aerial transparency including road 74, but not showing the gray scale of the photograph. In the actual practice of the invention, a transparency which is made up of many portions such as is shown in FIG. 5 would be presented for analysis, and as mentioned above, might illustratively include 625 sampling locations. A typical recognition exercise would be to determine how many of the sampling locations include a road.

Figure 6:
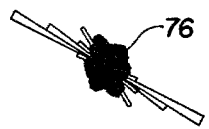
FIG. 6 depicts a Rose plot for the transparency portion shown in FIG. 4.

Before proceeding, it is instructive to refer to FIG. 6 which is a "Rose plot" of the diffraction pattern of the image shown in FIG. 5. Since the road is similar in optical effect to a slit, the diffraction pattern incident on wedge-ring detector 44 has a spike disposed perpendicular to the direction of the road. FIG. 6 is a visual presentation of the sampled intensity of the various wedges 52 of the wedge-ring detector, and shows a major wedge component perpendicular to the direction of the road, which corresponds to the above-mentioned spike, as well as subsidiary wedge components.

Figure 7:
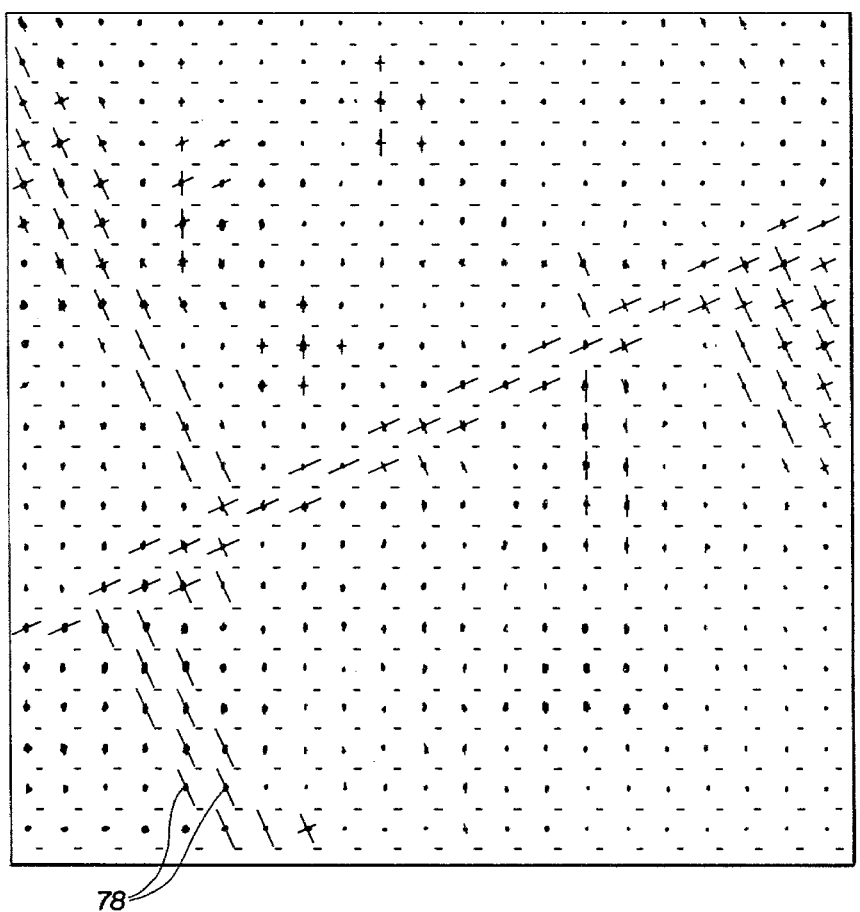
FIG. 7 is a plot of wedge Roses for the sampled area.

FIG. 7 is a representation of the wedge Rose array which is obtained for the lower left hand 21×21 locations of the total 625 sampling location area, with the wedge Roses rotated by 90°. It is seen by referring to this Figure, that the wedge Roses corresponding to the road line up in the same direction as the road. However, it is also seen that additional wedge roses having spikes, are present where there is no road, so that if frequency sampling by itself is relied on, a substantial error may be present.

FIG. 8 is a table which illustrates possible pattern recognition modes which may be utilized. In mode 1, wedge information only from the wedge-ring detector is utilized, in mode 2, both wedge and ring data is utilized, in mode 3, wedge data is supplemented from image domain data provided by the image array detector, and in mode 4, both wedge and ring data are supplemented by the image data.

The results obtained by processing data in accordance with the respective modes in a processor capable of making pattern recognition decisions is illustrated in the confusion matrices shown in FIG. 9. General pattern recognition computer programs for making recognition decisions are available and these would be modified in accordance with the invention to include hierarchal decisions involving both frequency and space domain data.

Referring to FIG. 9, the numbers represent sampling locations and the truth numbers are the actual numbers of road and non-road locations, respectively, which are derived from a control transparency which is used for evaluation. In the confusion matrices data within a matrix row represents the particular decision-maker findings while the matrix columns represent the truth data for the classes. For modes 1 and 2, an ideal decision-maker would have entries of 64 and 561 along the principle diagonal and zeros elsewhere. Nonzero values in the first row, right column, represent the number of commission errors, i.e., nonroad samples were classified as roads, while nonzero values in the second row, left column represent omission errors, i.e., road samples classed as nonroads.

The results for mode 1 indicate that with wedge only data a total of 100 out of the 625 samples were classed as road and 13 omission errors were made. In accordance with the invention, a desired strategy aims at employing frequency data to keep the false dismissal rate acceptably low and the image data to keep the misclassification rate acceptably low. This would indicate for mode 1 data that 49 false looks or false alarms would call for image domain processing to find roads which were not there, while 13 samples were misclassed as nonroad would not be corrected.

In mode 3, image domain data is utilized as well as spatial frequency domain data, and an improvement in results is noted. In mode 3, all of the samples which were indicated as being nonroad in mode 1 need not be processed in the image domain. Thus, the time that it would take to process all of these locations is saved in comparison to a system which utilizes soley digital image processing. In mode 3, it is seen that only a total of 34 sampling locations are misclassified, as opposed to 62 locations in mode 1, thus demonstrating the improvement effected by the addition of the image domain data.

Similarly, in mode 4, image domain data is added to the combination of wedge and ring data utilized in mode 2, with the result that 31 sampling locations are misclassified as opposed to 46 in mode 2. The truth values in mode 3 and 4 are somewhat different from those in modes 1 and 2, since different size sample apertures are used in the image and frequency modes.

It should be emphasized that the data shown in FIG. 9 is the result of only preliminary application of the invention, and may be improved upon by developing more sophisticated decision-making programs. For example, the concept of "context," or the identity of adjacent samples may be utilized. By referring to FIG. 7, in which it is seen how all of the wedge roses along the road are lined up while others aren't, it can be appreciated how the "context" in which a sample is found may be significant.

Further, it should be understood that the method of the invention may be practiced by an individual, without the aid of a computer, given enough time. The decision of whether or not to use image domain data for any sample would be made after observation of the frequency domain data.

In an actual experimental embodiment of the invention, an aerial transparency of the scale of approximately 1:40,000 was placed on the sampling stages of the system. Under computer control frequency domain and space array samples were automatically obtained at 625 locations on a square 25 by 25 grid and sequentially recorded on magnetic tape. The frequency sampling aperture was $\frac{1}{4}$" dia. and the space array about $\frac{1}{8}$" square. The samples were obtained to butt array data, therefore, frequency samples overlapped by ½ of the aperture for all adjacent samples.

It should be understood that while we have described certain embodiments of the invention, we do not intend to be restricted thereto, but rather intend to cover all variations and modifications which come within the spirit of the invention, which is limited only by the claims which are appended hereto.

We claim:

1. An apparatus for providing improved pattern recognition data, comprising,
    optical read-only memory means for storing a two dimensional image function having patterns to be recognized,
    coherent light source means for irradiating said read-only memory means with coherent light, which becomes modulated with information corresponding to said two dimensional image function.
    means responsive to said information contained in said coherent light for providing first data indicative of the optical power spectrum of said two dimensional image function, and
    means also responsive to said information contained in said coherent light for providing second data indicative of the spatial intensity distribution of said two dimensional image function,
    said improved pattern recognition data comprising said first and second data.

2. The apparatus of claim 1, wherein said means for providing first data indicative of the optical power spectrum of said image function includes optical means for providing the Fourier transform of said image function or of portions thereof.

3. The apparatus of claim 2, wherein said optical means comprises a transform lens means.

4. The apparatus of claim 3, wherein said means for providing second data indicative of the spatial intensity distribution of said image function includes photodetector array means.

5. The apparatus of claim 4, wherein said coherent light source means provides a sampling beam for irradiating said read-only memory means which is substantially smaller in diameter than the surface area of said memory means, further including translation means for moving said read-only memory means so that said beam irradiates it at a plurality of sampling locations.

6. The apparatus of claim 5, wherein said read-only memory means is a photographic transparency and said beam of light passes through said transparency.

7. The apparatus of claim 6 further defining two optical channels, a first of which includes said transform lens means and wedge-ring detecting means, and a second of which includes an imaging lens means and said photodetector array means.

8. The apparatus of claim 7 further including optical beam deflection means for directing said coherent light beam after passage through said transparency either to said first channel or said second channel.

9. An improved pattern recognition method comprising the steps of,
    providing a photographic transparency which stores a two dimensional image function having patterns to be classified,
    providing a beam of coherent light,
    sampling said transparency at a plurality of sampling locations with said beam of light, whereby after passing through said transparency said beam of light is modulated with information corresponding to a portion of said two dimensional image function,
    deriving first data which is indicative of the optical power spectrum of said sampled locations of said image function from said information in said beams of light,
    deriving second data which is indicative to the spatial intensity distribution of said sampled locations of said image function from the information contained in said beams of light,
    analyzing said first data indicative of said optical power spectrum to determine whether it meets predetermined criteria, and,
    if said first data meets said predetermined criteria, analyzing said second data.

* * * * *